United States Patent
Schzukin et al.

(10) Patent No.: US 6,694,388 B1
(45) Date of Patent: Feb. 17, 2004

(54) DYNAMIC QUEUING SYSTEM INCORPORATING MULTIPLE QUEUES SHARING A SINGLE MEMORY

(75) Inventors: Golan Schzukin, Tel Aviv (IL); Roni Elran, Raanana (IL); Zvika Bronstein, Ramat Efal (IL); Ilan Shimony, Haifa (IL)

(73) Assignee: 3Com Corporation, Santa Clara, CA (US)

( * ) Notice: Subject to any disclaimer, the term of this patent is extended or adjusted under 35 U.S.C. 154(b) by 720 days.

(21) Appl. No.: 09/584,582

(22) Filed: May 31, 2000

(51) Int. Cl.[7] .................................................. G06F 3/00
(52) U.S. Cl. .......................... 710/52; 710/52; 710/53; 710/54; 710/55; 710/56
(58) Field of Search .............................. 710/54, 56, 52, 710/53, 55

(56) References Cited

U.S. PATENT DOCUMENTS

| | | | |
|---|---|---|---|
| 4,807,111 A | * | 2/1989 | Cohen et al. |
| 5,541,912 A | * | 7/1996 | Choudhury et al. |
| 5,625,625 A | * | 4/1997 | Oskouy et al. |
| 5,881,316 A | * | 3/1999 | Chaney et al. |

FOREIGN PATENT DOCUMENTS

WO    WO 99/00738    * 1/1999 ............ G06F/13/00

OTHER PUBLICATIONS

Introduction to Algorithms by Cormen, Leiserson, Rivest, Stein; MIT Press, 2nd Edition, Sections 10.2 and 10.3.*
ATM Practical Implementations Here and Now, 3COM Corporation, 1996.

* cited by examiner

Primary Examiner—Jeffrey Gaffin
Assistant Examiner—Alan Chen
(74) Attorney, Agent, or Firm—Howard Zaretsky (57) ABSTRACT

A dynamic queuing system wherein a single memory is shared among a plurality of different queues. A single memory, termed a queue memory, is by ally shared by one or more queue. The queue memory is divided into a plurality of memory blocks that we initially empty. An empty list functions to track which memory blocks are empty and available for use in a queue. Each queue constructed utilizes one or more memory blocks. When a queue becomes full, an additional memory block is allocated to it. Conversely, as memory blocks of a queue are read, i.e. emptied, they are returned to the pool of empty memory blocks for use by other queued.

27 Claims, 5 Drawing Sheets

DYNAMIC QUEUING SYSTEM INCORPORATING MULTIPLE QUEUES SHARING A SINGLE MEMORY

FIELD OF THE INVENTION

The present invention relates generally to queuing systems and more particularly relates to a dynamic queuing system wherein a single memory is shared

BACKGROUND OF THE INVENTION

Currently, the number of data networks and the volume of traffic these networks carry are increasing at an ever faster rate. The network devices that make up these networks generally consist of specialized hardware designed to move data at very high speeds. Typical networks, such as Ethernet based networs, are mainly comprised of end stations, Ethernet hubs, switches, routers, bridges and gateways. ATM networks are constructed with similar network devices adapted to carry ATM traffic, e.g., ATM capable end stations, edge devices and ATM switches.

With the ever increasing user demand for faster and faster data communications, network devices have had to perform at higher and higher speeds. A primary function of many network devices is to receive frames (packets, cells, etc.) at one or more ingress ports, and forward the frame to the appropriate egress port. Accomplishing this requires that the network device store and process data at one or more stages. The device may queue data received from the input ports, data waiting to be written to output ports and data generated at one or more intermediate processing stages. This requires the creation of a plurality of queues within the internal memory of the device. The size of the queues required typically depends on the internal architecture of the device, the required processing speed, and other parameters.

It is thus desirable to have an efficient mechanism of creating and maintaing a plurality of queues in a network device. Due to the potentially rapid changes in network traffic that a network device may essence from one moment to the next it is also desirable to implement the queuing system in a dynamic fashion. In such a system, queues may be created, utilized and removed on a dynamic basis. Further, it is desirable to be able to dynamically change the size of a queue depending on the requirements of the network device at any particular point in time.

SUMMARY OF THE INVENTION

The present invention provides a dynamic queuing system wherein a single memory is shared among a plurality of different queues. The queues may comprise any suitable type of queue such as the well known Last In First Out (LIFO) type queue or First In First Out (FIFO) type queue. Each queue is created using one or more blocks of queue memory. On a dynamic basis, the queue may take additional blocks from memory in order to increase its size. Conversely, it may return unused blocks to memory on a dynamic basis as well thus reducing the size of the queue.

For illustration purposes, the principles of the present invention are described in the context of an example network device comprising an ATM edge device having a plurality of Ethernet ports and one or more ATM ports. Note, however, it is not intended that the invention be limited to the network device described herein.

In accordance with the present invention, a single memory, termed a queue memory, is dynamically shared by one or more queues. The queue memory is divided into a plurality of memory blocks that are initially empty. An empty list functions to track which memory blocks are my and available for use in a queue. Each queue that is constructed utilizes one or more memory blocks. When a queue becomes full, an additional memory block is allocated to it. Conversely, as memory blocks of a queue are read, i.e. Emptied, they are returned to the pool of empty memory blocks for use by mother queues.

The queue memory may be constructed from single or multiple physical memories and may or may not have a contiguous address space. Preferably, the memory comprises a single contiguous memory block in order to simplify the queue control circuitry used to read and write data from and to the queue Memory.

The queue memory is divided into a plurality of memory blocks. Preferably, all memory blocks are of a uniform size. The invention can also operate with memory blocks having different sizes as long as the queue control circuitry is adapted accordingly.

In operation, the queue memory is the shared memory that is used by all the queues. The memory is divided into a plurality of memory blocks wherein each memory block is represented by an entry in an empty list. The empty list is stored in a group memory and preferably implemented as a singly or doubly linked list. A first pointer points to an entry that is the first empty memory block on the empty list. When a memory block is to be allocated to a queue, the memory block pointed to the first pointer is the memory block to be allocated.

A last pointer functions to point to an entry that is the last empty memory block on the empty list When a memory block is to be de-allocated from a queue, the memory block de-allocated is written to the last pointer. An empty counter function to track the number of memory blocks currently on the empty list.

Note that upon reset or initialization of the queue system, all the entries in the group memory are linked together on the empty list. As memory blocks are allocated, entries are removed from the empty list.

There is thus provided in accordance with the present invention a dynamic queuing system comprising a queue memory divided into a plurality of equal length memory blocks, a first list for storing a list of empty memory blocks that are currently not in use, means for creating a queue by allocating an empty memory block from the queue memory, removing the allocated memory block from the first list and creating a second list for storing the memory blocks that make up the queue, a queue control circuit including, means for writing to the queue including a write pointer for identifying the next location in the queue available for writing, means for reading from the memory queue including a read pointer for identifying the next location in the queue to be read, means for increasing the size of the queue when the queue is full, including allocating an additional memory block from the queue memory, removing the allocated memory block from the first list and adding the newly allocated memory block to the second list and means for reducing the size of the queue when a memory block becomes empty, including de-allocating the empty memory block, adding the de-allocated memory block to the first list and removing the de-allocated memory block from the second list.

There is also provided in accordance with the present invention a dynamic queuing method, the method comprising the steps of dividing a queue memory into a plurality of equal length memory blocks, storing a first list of empty memory blocks that are currently not in use, creating a queue by allocating an empty memory block from the queue memory, removing the allocated memory block from the first list and creating a second list for storing the memory blocks making up the queue, writing to the queue utilizing a write pointer for identifying the next location in the queue available for writing, reading from the memory queue utilizing a read pointer for identifying the next location in the queue to be read, increasing the size of the queue when the queue is full by allocating an additional memory block from the queue memory, removing the allocated memory block from the first list and adding the newly allocated memory block to the second list and reducing the size of the queue when a memory block becomes empty by de-allocating the empty memory block, adding the de-allocated memory block to the first list and removing the de-allocated memory block from the second list.

BRIEF DESCRIPTION OF THE DRAWINGS

The invention is herein described, by way of example only, with reference to the accompanying drawings, wherein.

DETAILED DESCRIPTION OF THE INVENTION
Notation Used Throughout
The following notation is used throughout this document.

| Term | Definition |
| --- | --- |
| ATM | Asynchronous Transfer Mode |
| BUS | Broadcast and Unknown Server |
| DA | Destination Address |
| ELAN | Emulation LAN |
| FIFO | First In First Out |
| IP | Internet Protocol |
| LAN | Local Area Network |
| LE | LAN Emulation |
| LEC | LAN Emulation Client |
| LECS | LAN Emulation Configuration Server |
| LES | LAN Emulation Server |
| LIFO | Last In First Out |
| MAC | Media Access Control |
| MPOA | Multiprotocol Over ATM |
| NVRAM | Nonvolatile Random Access Memory |
| OC | Optical Carrier |
| PDU | Protocol Data Unit |
| RAM | Random Access Memory |
| RBP | Read Block Pointer |
| RP | Read Pointer |
| SA | Source Address |
| SMS | Selective Multicast Server |
| VCI | Virtual Circuit Identifier |

DETAILED DESCRIPTION OF THE INVENTION
Notation Used Throughout
The following notation is used throughout this document.

| Term | Definition |
| --- | --- |
| VLAN | Virtual Local Area Network |
| VPI | Virtual Path Identifier |
| WBP | Write Block Pointer |
| WP | Write Pointer |

DESCRIPTION OF THE INVENTION

The present invention provides a dynamic queuing system wherein a single memory is shared among a plurality of different queues. The queues may comprise any suitable type of queue such as the well known Last In First Out (LIFO) type queue or First In First Out (FIFO) type queue. Each queue is created using one or more blocks of queue memory. On a dynamic basis, the queue may take additional blocks from memory in order to increase its size. Conversely, it may return unused blocks to memory on a dynamic basis as well thus reducing the size of the queue.

For illustration purposes, the principles of the present invention are described in the context of an example network device comprising an ATM edge device having a plurality of Ethernet ports and one or more ATM ports. Thus, the example device is simultaneously connected to an Ethernet network and an ATM network. Note, however, it is not intended that the invention be limited to the network device described herein. It is appreciated that one skilled in the electrical or networking arts may apply the present invention to numerous other types of devices as well without departing from the spirit and scope of the invention. Note that throughout this document, references are made to Ethernet frames and ATM cells which are example protocol data units (PDUs) associated with Ethernet networks and ATM networks, respectively. It is appreciated that the invention may be adapted for use in other types of networks that transmit other types of PDUs, e.g., packets.

Figure 1:
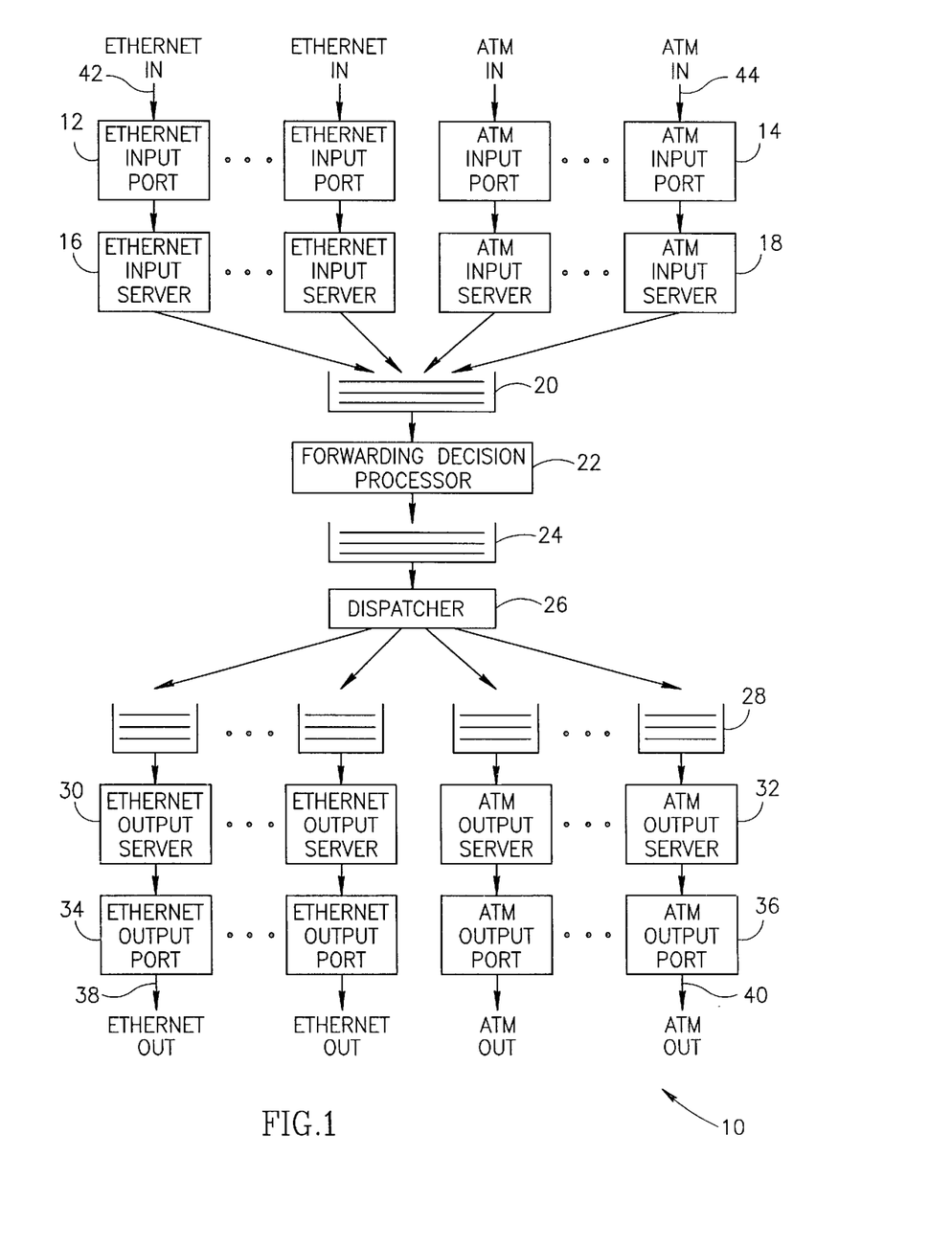
FIG. 1 is a block diagram illustrating a queuing system implemented in an ATM edge device incorporating multiple Ethernet and ATM ports.

A block diagram illustrating a queuing system implemented in an ATM edge device incorporating a plurality of Ethernet and ATM ports is shown in FIG. 1. The example network device, generally referenced 10, comprises an edge device for use in an ATM network. The device 10 comprises a plurality of Ethernet ports and ATM ports. In addition, the device provides standard LAN Emulation services, such as LEC, BUS, LECS, LES, SMS, etc., as defined by ATM Forum LAN Emulation standards. LAN Emulation permits Ethernet traffic to be transported across ATM circuits. For illustration purposes, the Ethernet and ATM ports in the network device have been separated into ingress and egress portions.

In particular, input Ethernet ports 12 are connected to an Ethernet network and adapted to receive ingress Ethernet frames 42. Similarly, input ATM ports 14 are connected to an ATM network and adapted to receive ingress ATM cells 44. The input Ethernet frames are processed by an Ethernet input server 16 which places the received frames into a queue 20. The frames placed in the queue 20 are to be subsequently processed and a forwarding decision made for each. Similarly, the input ATM cells are processed by an ATM input server 18 which places the received cells into the queue 20. The cells placed in the queue 20 are subsequently processed and a forwarding decision made for each.

Output Ethernet ports 34 are connected to the Ethernet network and adapted to output egress Ethernet frames 38. Similarly, output ATM ports 36 are connected to the ATM network and adapted to output egress ATM cells 40.

The ATM ports, for example, may operate at 155 Mbps (OC-3) or 622 Mbps (OC-12). The Ethernet ports may operate at 10 Mbps Ethernet, 100 Mbps Fast Ethernet or 1000 Mbps Gigabit Ethernet.

The device comprises a forwarding decision processor 22, dispatch queue 24, dispatcher 26 and a plurality of output queues 28. Forwarding decisions are made by the forwarding decision processor 22 that is configured dynamically by a host processor or upper software layer (not shown). The ingress Ethernet frames and ATM cells input to the input queue 20 are processed by the forwarding decision processor 22. In one alternative implementation of the network device, Ethernet frames on each of the Ethernet ports are segmented into ATM cells before being placed into the input queue 20.

The forwarding decision processor 22 functions to make a forwarding decision using a lookup procedure. A forwarding table stores the forwarding decision information. The forwarding mechanism may utilize one or more input parameters in making a forwarding decision. Such parameters include but are not limited to Ethernet MAC DA, Ethernet MAC SA, IP DA, VLAN ID, LEC ID, Ethernet input port, ATM input port, ingress frame type, VPI/VCI, ELAN ID and MPOA tag.

The processing of the forwarding decision is performed using a forwarding table lookup and is operative to generate forwarding information The forwarding decision, represented as an output port vector, is then written to the dispatch queue 24 along with the frame. The data written to the dispatch queue 24 is read by the dispatcher 26 which felons to forward the frame to one or more output queues 29 in accordance with the forwarding decision, i.e. output pout vector. Frames written to Ethernet output queues are read by a corresponding Ethernet output server 30. The Ethernet output servers 30 function to read frames from their associated output queues and write them to the corresponding Ethernet output port 34. The Ethernet output port function to transmit the egress data 38 over the Ethernet network. Note that cell data destined to an Ethernet port is assembled back into Ethernet frames before transmission through the output port.

Frames written to ATM output queues are read by the corresponding AIM output server 32. The ATM output servers 32 function to read frames from their associated output queues and write them to the corresponding ATM output port 36. The ATM output port functions to transmit the egress data 40 over the ATM network.

The Ethernet ports within the device may be adapted to transmit and receive 10 Mbps, 100 Mbps or 1000 Mbps Ethernet signals. The example device is also adapted to provide Layer 2 and Layer 3 switching among the Ethernet ports. Further, the device may support PLANS, multi cast and MPOA protocols. A main function of the device is to forward data frames between the two types of networks, i.e. Ethernet and ATM, via the ports connected to each type of network. The Ethernet frame received may contain various parameters that are used in the forwarding process such as, for example, MAC Destination Address (DA), MAC Source Address (SA), IP DA, VLAN ID, LEC ID, ELAN ID, LE frames (received from ATM) and MPOA frames.

In accordance with the present invention, a singe memory, termed a queue memory, is dynamically shared by one or more queues The queue memory is divided into a plurality of memory blocks that are initially empty. An empty list functions to track which memory blocks ate empty and available for use in a queue. Each queue that is constructed utilizes one or more memory blocks. When a queue becomes full, an additional memory block is allocated to it. Conversely, as memory blocks of a queue are read, i.e. Emptied, they are refuted to the pool of empty memory blocks for use by other queues.

The queue memory may be constructed from single or multiple physical memories and may or may not have a contiguous address space. Preferably, the memory comprises a single contiguous memory block in order to simplify the queue control circuitry used to read and write data from and to the queue memory.

Figure 2A:
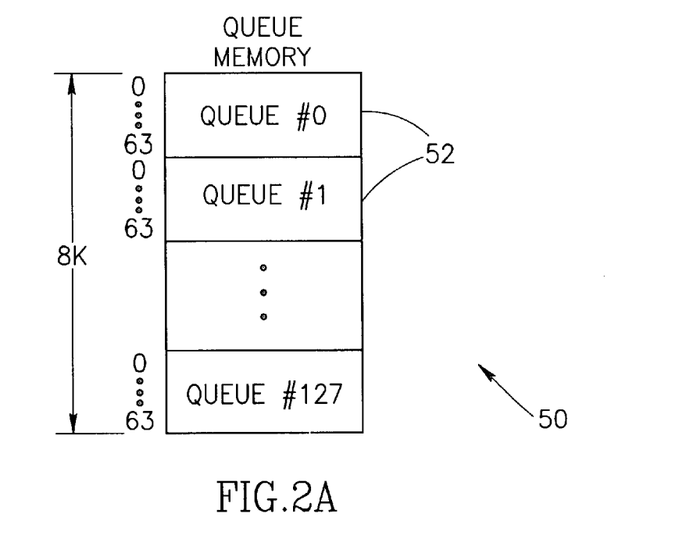
FIG. 2A is a block diagram illustrating the queue memory comprising a single shared memory.
Figure 2B:
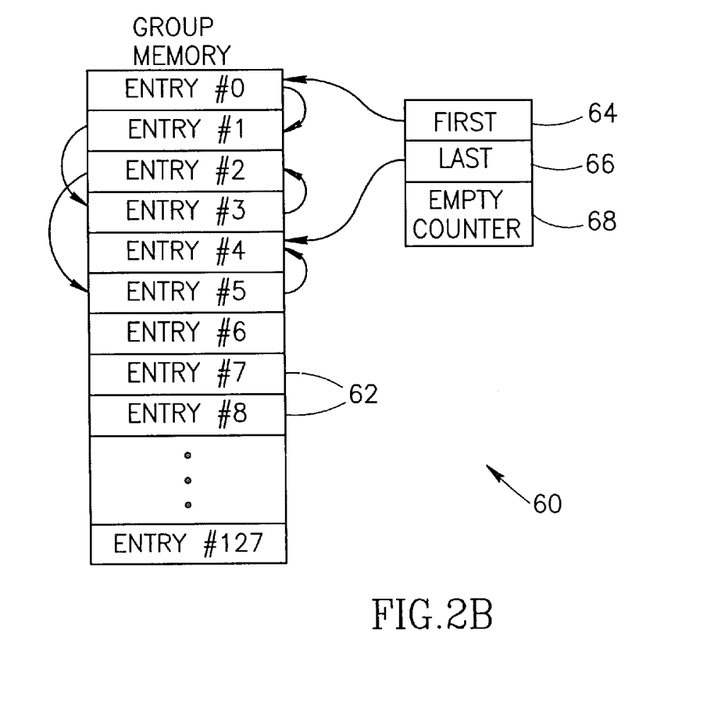
FIG. 2B is a block diagram illustrating the group memory portion of the queuing system incorporating first, last and empty counter registers.

A block diagram illustrating the queue memory comprising a single shared memory is shown in FIG. 2A. A block diagram illustrating the group memory portion of the queuing system incorporating first, last and empty counter registers is shown in FIG. 2B. The queue memory, generally referenced 50, is divided into a plurality of memory blocks 52. Preferably, all memory blocks are of a uniform size. The invention will also operate with memory blocks having different sizes as long as the queue control circuitry is adapted accordingly. For illustration purposes, an example is presented herein whereby the queue memory comprises 8192 entries and is divided into 128 memory blocks, labeled queue #0 through queue #127, each memory block comprising 64 entries. The queue memory may be constructed using any suitable read/write memory such as random access memory (RAM), non volatile RAM (NVRAM), or other types of memory.

In operation, the queue memory 50 is the shared memory that is used by all the queues. Note that the invention may be used to construct any type of queue such as LIFO, FIFO, etc. For illustration purposes, a FIFO queuing system is provided as an example.

The memory is divided into a plurality of memory blocks wherein each memory block is represented by an entry 62 in an empty list 60. The empty list is stored in a group memory and preferably implemented as a singly or doubly linked list. A first pointer 64 points to an entry that is the first empty memory block on the empty list. When a memory block is to be allocated to a queue, the memory block pointed to the first pointer is the memory block to be allocated.

A last pointer 66 functions to point to an entry that is the last empty memory block on the empty list. When a memory block is to be de-allocated from a queue, the memory block de-allocated is written to the last pointer. An empty counter 68 functions to track the number of empty memory blocks currently on said empty list.

Note that upon reset or initialization of the queue system, all the entries 62 in the group memory 60 are linked together on the empty list. As memory blocks are allocated, entries are removed from the empty list. A queue memory of size 8192 divided into 128 memory blocks yields a group memory comprising 128 entries. Thus, initially, the empty list comprises all 128 entries.

Note that the above example is provided for illustration purposes only. One skilled in the art may apply the principles of the present invention to construct a dynamic queue system having a size, number of memory blocks, and memory block size in accordance with the requirements of the particular application.

It is important to point out, however, that as the size of the memory blocks increase, less control space is required for controlling the queue thus reducing the size of the group memory. With a larger memory block size, however, the shared memory is partitioned in a less efficient way. Thus, the optimum balance between memory block size, group memory size and efficiency in the use of the shared memory needs to be found for each particular application. An advantage of the present invention is that is it provides the queuing system designer the ability to determine the optimum balance per the in accordance with system requirements between the size of the control space (i.e. group memory) and the amount of flexibility desired in the size of the queue.

In order to implement a dynamic FIFO queuing system, four pointers and a counter are used:

1. A Read Block Pointer (RBP) representing the memory block currently used to pop data out of the FIFO. The RBP pointer ranges from 0 through 127.
2. A Write Block Pointer (WBP) representing the memory block currently used to push data into the FIFO. The WBP pointer ranges from 0 through 127.
3. A Read Pointer (RP) representing the offset with the memory block currently used to pop data out of the FIFO. The RP pointer ranges from 0 through 63.
4. A Write Pointer (RP) representing the offset with the memory block currently used to push data into the FIFO. The WP pointer ranges from 0 through 63.
5. A Block Counter representing the number of memory blocks that are linked together forming the queue.

As applied to the network edge device of FIG. 1, each output port server and output port has an associated FIFO queue. The queues are implemented using the dynamic queuing system of the present invention. Each output queue has associated with it, a set of the above pointers, in particular: WBP, RBP, RP, WP and Block Counter.

Figure 3:
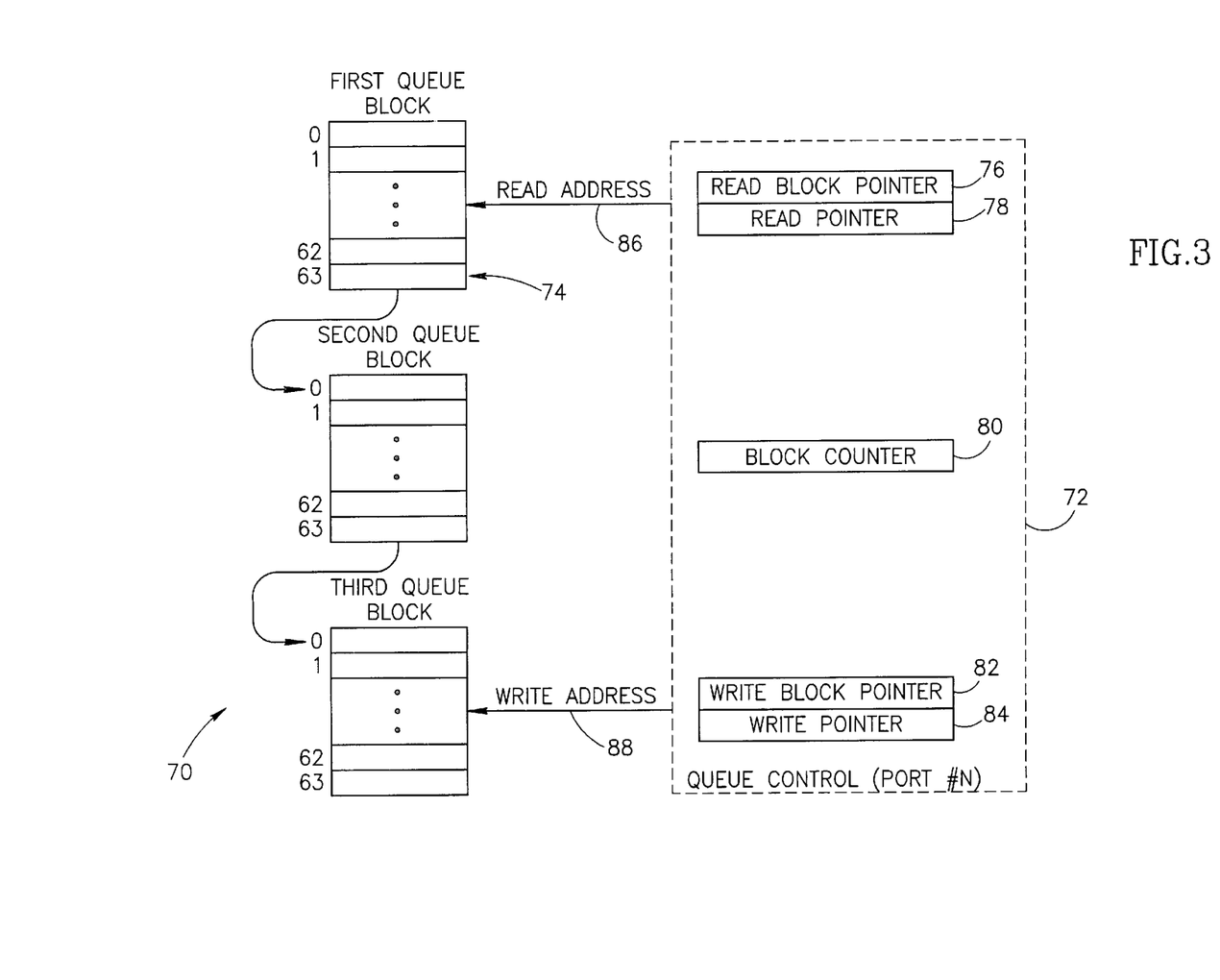
FIG. 3 is a block diagram illustrating an example queuing system constructed in accordance with the present invention that utilizes three queue blocks.

To illustrate the principles of the present invention, an example FIFO queue is presented that utilizes the dynamic queuing stem of the present invention. A block diagram illustrate an example queuing system constructed in accordance with the present invention that utilizes three queue blocks is shown in FIG. 3. The FIFO queue, genially referenced 70, has allocated to it three memory blocks 74, labeled FIRST QUEUE BLOCK SECOND OUEUE BLOCK and THIRD QUEUE BLOCK each memory block 74 comprising 64 entries.

A queue control circuit 72 is operative to read and write data from and to the memory blocks. A push command to the queue causes data to be written to the next available entry in the queue. A pop command to the queue causes data to be read from the queue. The WBP 82 points to the memory block currently being written to. The WP 84 points to the entry within the memory block pointed to by the WBP to be written to. Thus, the write address 88 is formed by a combination of the WBP and WP. In particular, the write address is calculated using WBP*64+WP.

The RBP 76 points to the memory block currently being read from. The RP 78 points to the entry within the memory block pointed to by the RBP to be read. Thus, the read address 86 is formed by a combination of the RBP and RP. In particular, the read address is calculated using RBP*64+RP. The Block Counter 80 functions to track the number of memory blocks currently used by the queue. In this example, the value of the Block Counter equals three.

Note that a separate set of pointers and block counter is maintained for each queue. In this example, each queue is associated with a particular output port.

Initially, the first queue memory block is allocated from the empty list and the RBP, RP, WBP, WP are set to point to the beginning of the allocated memory block. The block counter is set to one. When the first memory block becomes full, a second queue memory block is allocated and chained to the first block. The block counter is incremented to two and the WBP and WP are modified to point to the second memory block. Similarly, when the second memory block becomes full, a third queue memory block is allocated and added to the queue chain. The WBP and WP pointers are modified accordingly and the block counter is incremented to three.

When the first memory block becomes empty (i.e. all 64 entries are read) it is removed from the queue chain and returned to the empty list. On the empty chain, it is linked to the block indicated by the last pointer. Note that the queue chain can be implemented as a linked list comprising the memory blocks currently making up the queue. The linked list comprises pointers to the memory blocks. As memory blocks are added to the chain, a pointer to the new memory block is added to the tail of the linked list. As a memory block is removed from the queue, the pointer to the memory block is removed from the head of the linked list.

Figure 4:
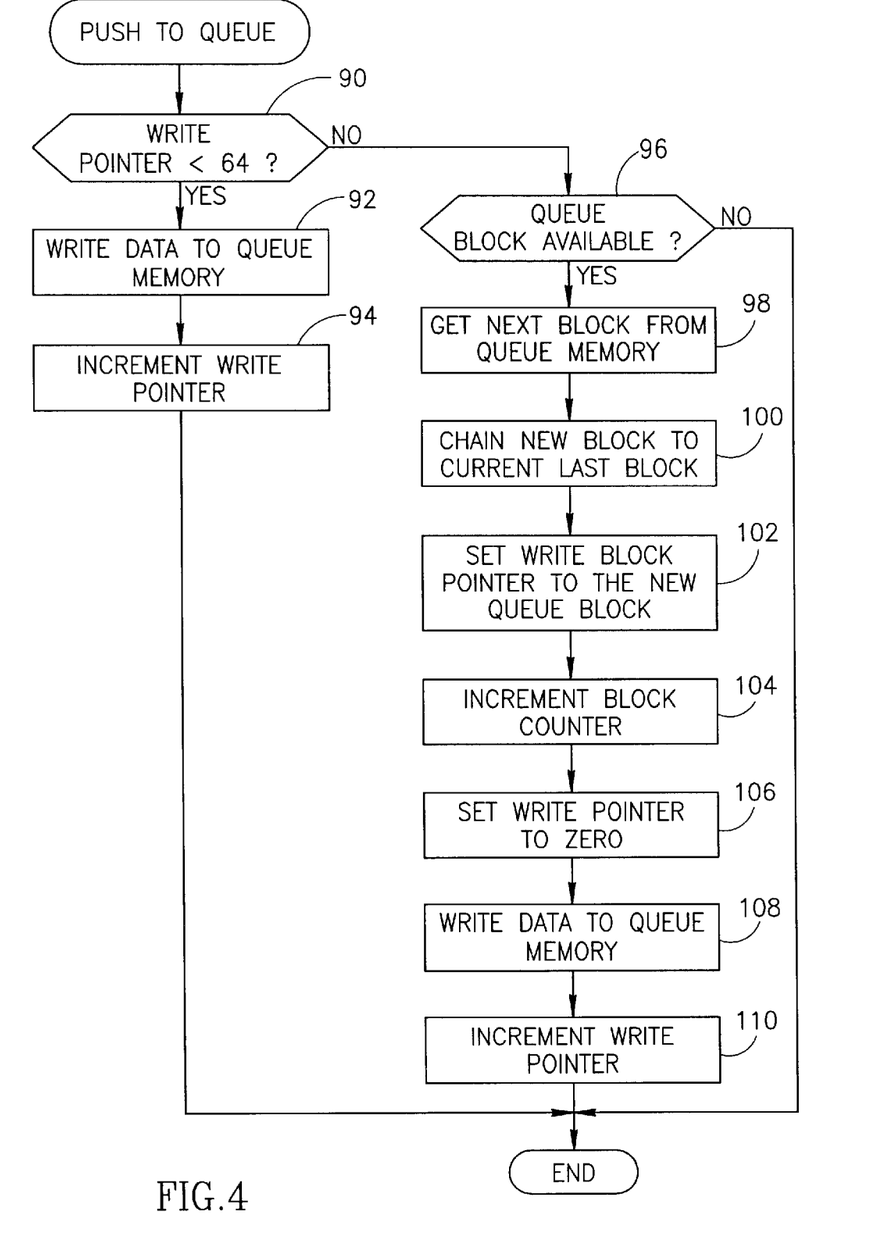
FIG. 4 is a flow diagram illustrating the method of pushing data onto the queue.

The method of pushing data onto the queue will now be described in more detail. A flow diagram illustrating the method of pushing data onto the queue is shown in FIG. 4. As described above, the queue control circuit 72 (FIG. 3) comprises the circuitry for pushing data onto the queue. The functions performed by the circuitry are described herein. First, the Write Pointer is checked if it is less than 64, i.e. the memory block currently being written to is not full (step 90). If it is not full, the data is written to the queue memory block at the location WBP*64+WP (step 92). The WP is then incremented (step 94).

If the WP is not less than 64, i.e. the memory block currently being written to is full (step 90), this indicates that the memory block is full and an additional memory block must be allocated. It is then checked whether a queue memory block is available (step 96). If the empty counter is greater than zero, than an empty memory block is available. Note that even if a memory block is available, additional constraints and restrictions may be placed on the allocation of memory blocks to a queue. For example, each queue may be restricted to a particular size, the queue may require one or more permissions to be set before additional memory is allocated, etc.

Assuming that an additional memory block may be allocated for this queue, the next available memory block in the empty list is allocated to the queue (step 98). The memory block to be allocated is pointed to by the empty list first pointer 64 (FIG. 2B). The newly allocated memory block is then chained to the tail of the queue (step 100). This is accomplished by adding a pointer to the memory block to the tail of the queue chain linked list.

The WBP is then set to point to the newly allocated memory block (step 102) and the Block Counter is incremented (step 104). The Write Pointer is initialized to zero (step 106) and the data to be pushed is written to the queue at a location given by WBP*64+WP (step 108). The Write Pointer is then incremented (step 110).

Figure 5:
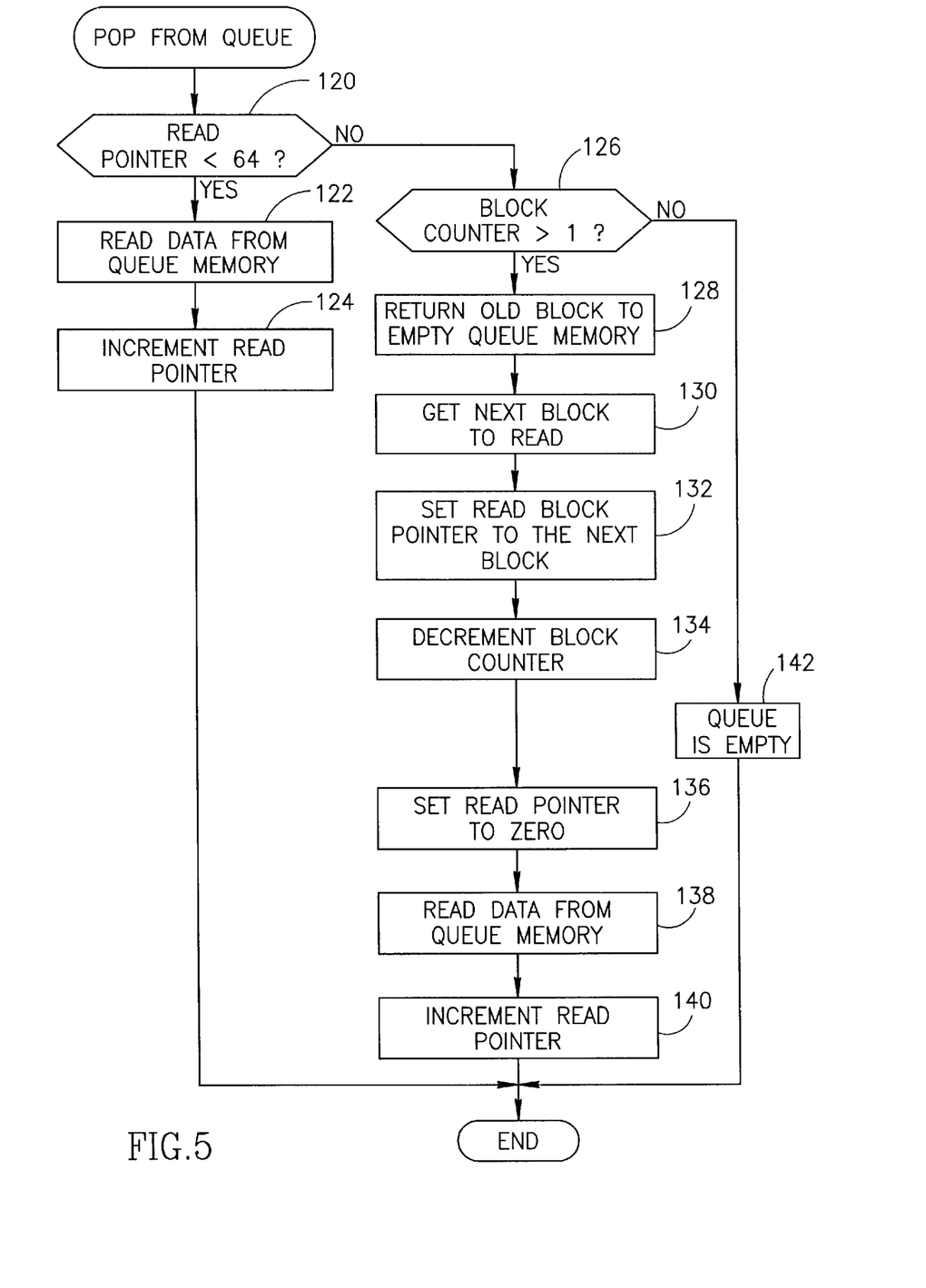
FIG. 5 is a flow diagram illustrating the method of popping data from the queue.

The method of popping data from the queue will now be described in more detail. A flow diagram illustrating the method of popping data from the queue is shown in FIG. 5. As described above, the queue control circuit 72 (FIG. 3) comprises the circuitry for popping data from the queue. The functions performed by the circuitry are described herein. First, the Read Pointer is checked if it less than 64, i.e. the memory block currently being read from is not empty (step 120). If it is not empty, the data is read from the queue memory block at the location RBP*64+RP (step 122). The Read Pointer is then incremented (step 124).

If the Read Pointer is not less than 64, i.e. the memory block currently being read from is empty (step 120), this indicates the memory block is empty and is to be deallocated and returned to the empty list. It is then checked whether this is the only memory block in the queue (step 126). In particular, the Block Counter is checked if it is grater than one. If the Block Counter is not eater than one, than this is the last memory block in the queue and the queue in empty (step 142). Depending on the desired behavior of the queue, at least one memory block may remain on the queue or, alternatively, the memory block may be removed from the queue and returned to the empty list. In this example embodiment the queue is left with at least one memory block. This is preferable if it is likely that the queue is to be written to again.

If the Block Counter is greater than one (step 126), indicating that the queue comprises two or more memory blocks, than the empty memory block is returned to the empty queue (step 128). The empty memory block is removed from the head of the queue chain linked list. The empty memory block is added to the empty linked list at the tail.

The next memory block in the queue chain is retrieved from the head of the queue chain linked list (step 130). The Read Block Pointer is modified to point to the memory block retrieved from the head of the queue chain linked list (step 132). The Block Counter is decremented (step 134) and the Read Pointer is initialized to zero (step 136). Data is then read from the queue memory block at a location given by RBP*64+RP (step 138). The Read Pointer is then incremented (step 140).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A dynamic quieting system for dynamically establishing a plurality of transmit and receive queues, comprising:
   a queue memory adapted to be dynamically shared by a plurality of transmit and receive queues, said queue memory divided into a plurality of equal length memory blocks;
   a first linked list adapted to track memory blocks currently not used and available for use in a queue;
   a plurality of queues, each said queue represented by a second linked list of one or more memory blocks of said queue memory, wherein a queue is created by allocating an available memory block from said queue memory, removing said allocated memory block from said first linked list and creating said second linked list for representing the one or more memory block that make up said queue;
   a queue control circuit including:
      means for writing to a queue including a write pointer for identifying the next location in a queue available for writing;
      means for reading from a queue including read pointer for identifying the next location in a queue to be read;
      means for increasing the size of a queue when a queue becomes full, including allocating an additional memory block from said queue memory, removing the allocated memo block from the first linked list and adding the newly allocated memory block to the second linked list; and
      means for reducing the size of a queue when a memory block becomes empty, including de-allocating the empty memory block, adding the de-allocated memory block to the first linked list and removing the de-allocated memory block from the second linked list.

2. The queuing system according to claim 1, wherein said first linked list comprises means for storing a first entry in said first linked list, a last entry in said first linked list and a soup counter indicating the number of empty memory blocks currently on said first linked list.

3. The queuing system according to claim 1, further comprising means for allocating memory blocks according to a first pointer adapted to indicate the next available memory block.

4. The queuing system according to claim 1, further comprising means for returning de-allocated memory blocks to said first lined list in accordance with a last pointer adapted to indicate the last empty memory block on said first linked list.

5. The quelling system according to claim 1, wherein said first linked list comprises a linked list of pointers to empty memory blocks in said queue memory.

6. The queuing system according to claim 1, wherein said second linked list comprises a linked list of pointers to memory blocks currently allocated to a queue.

7. The queuing system according to claim 1, wherein said queue memory comprises a single contiguous portion of memory.

8. The queuing system according to claim 1, wherein said queue control circuit comprises means for creating and maintaining a read block pointer for indicating the current memory block in a queue chain for reading.

9. The queuing system according to claim 1, wherein said queue control circuit comprises means for creating and maintaining a write block pointer for indicating the current memory block in a queue chain for writing.

10. The queuing system wording to claim 1, wherein said means for increasing the size of said queue comprises means for molding a write block pointer to point to the newly allocated memory block.

11. The queuing system according to claim 1, wherein said means for decreasing the size of said queue comprises means for modifying a read block pointer to point to the next memory block to be read in said second linked list.

12. The queuing system according to claim 1, wherein said queue comprises a First In First Out (FIFO) queue.

13. The queuing system according to claim 1, wherein said queue comprises a Last In First Out (LIFO) queue.

14. A dynamic queuing method for dynamically establishing a plurality of transit and receive queues, said method comprising the steps of:
   dividing a queue memory into a plurality of equal length memory blocks, said queue memory adapted to be dynamically shared by a plurality of transmit and receive queues;
   establishing a first linked list adapted to track memory blocks currently not used and available for use in a queue;
   creating a plurality of queues, each said queue represented by a second linked list of one or more memory blocks of said queue memory, wherein a queue is created by allocating an available memory block from said queue memory removing said allocated memory block from said first linked list and creating said second linked list for representing the one or more memory blocks that make up said queue;

writing to a queue utilizing a write pointer for identifying the next location in a queue available for writing;

reading from a queue utilizing a read pointer for identifying the next location in a queue to be read;

increasing the size of a queue when a queue is full by allocating an additional memory block from said queue memory removing the allocated memory block from the first linked list and adding the newly allocated memory block to the second linked list; and reducing the size of a queue when a memory block becomes empty by de-allocating, empty memory block, adding the de-allocated memory block to the first linked list and removing the de-allocated memory block from the second linked list.

15. The method according to claim 14, wherein said step of establishing a first linked list comprises storing a first entry in said first linked list, a last entry in said first linked list and a group counter indicating the number of empty memory blocks currently on said first linked list.

16. The method according to claim 14, further comprising the step of allocating memory blocks according to a first pointer adapted to indicate the next available memory block.

17. The method according to claim 14, further comprising the step of returning de-allocated memory blocks to said first linked list in accordance with a last pointer adapted to indicate the last empty memory block on said fist linked list.

18. The method according to claim 14, wherein said first linked list comprises a linked list of pointers to empty memory blocks in said queue memory.

19. The method according to claim 14, wherein said second linked list comprises a linked list of pointers to memory blocks currently allocated to a queue.

20. The method according to claim 14, wherein said queue memory comprises a single contiguous portion of memory.

21. The method according to claim 14, wherein said step of creating a queue comprises creating and mining a read block pointer for indicating the current memory block in a queue chain for reading.

22. The method according to claim 14, wherein said step of creating a queue comprises creating and maintaining a write block pointer for indicating the current memory block in a queue chain for writing.

23. The method according to claim 14, wherein said step of increasing the size of a queue comprises modifying a write block point to point to the newly allocated memory block.

24. The method according to claim 14, wherein said step of decreasing the size of a queue comprises modifying a read block pointer to point to the next memory block to be read in said second linked list.

25. The method according to claim 14, further comparing the step of maintaining a block counter adapted to indicate the number of memory blocks in a queue.

26. The method according to claim 14, wherein said queue comprises a First In First Out (FIFO) queue.

27. The method according to claim 14, wherein said queue comprises a Last In First Out (LIFO) queue.

* * * * *